United States Patent [19]
Bohner et al.

[11] Patent Number: 6,112,844
[45] Date of Patent: *Sep. 5, 2000

[54] POWER STEERING FOR MOTOR VEHICLES

[75] Inventors: Hubert Bohner, Böblingen; Martin Moser, Fellbach, both of Germany

[73] Assignee: DaimlerChrysler AG, Stuttgart, Germany

[ * ] Notice: This patent is subject to a terminal disclaimer.

[21] Appl. No.: 08/745,753

[22] Filed: Nov. 8, 1996

[30] Foreign Application Priority Data

Nov. 9, 1995 [DE] Germany .......................... 195 41 752

[51] Int. Cl.[7] ..................................... B62D 5/04
[52] U.S. Cl. ..................... 180/403; 180/402; 180/405; 180/422; 180/443
[58] Field of Search .................... 180/402, 403, 180/405, 406, 407, 422, 417, 426, 421, 443; 91/367, 367 A, 363 R, 361

[56] References Cited

U.S. PATENT DOCUMENTS

| | | |
|---|---|---|
| 4,557,342 | 12/1985 | Drutchas . |
| 4,940,105 | 7/1990 | Matsunaga et al. . |
| 5,070,956 | 12/1991 | Pawlak et al. . |
| 5,080,186 | 1/1992 | Elser et al. ............................. 180/142 |
| 5,135,069 | 8/1992 | Hattori et al. ......................... 180/422 |
| 5,156,229 | 10/1992 | Yasui et al. ........................... 180/402 |
| 5,159,553 | 10/1992 | Karnopp et al. ....................... 180/402 |
| 5,172,785 | 12/1992 | Takahashi ............................. 180/402 |
| 5,253,729 | 10/1993 | Suzuki .................................. 180/422 |
| 5,269,389 | 12/1993 | Tomiyoshi . |
| 5,289,894 | 3/1994 | Yoshiyuki Yasui ................... 180/403 |

FOREIGN PATENT DOCUMENTS

| | | |
|---|---|---|
| 0 636 530 | 2/1995 | European Pat. Off. . |
| 39 18 987 | 12/1989 | Germany . |
| 43 30 338 | 9/1994 | Germany . |

*Primary Examiner*—Anne Marie Boehler
*Attorney, Agent, or Firm*—Klaus J. Bach

[57] ABSTRACT

In a hydraulic power steering for a motor vehicle including a steering control element, a position setting means connected to the steering control element to be operated thereby, a control motor connected to the position setting means by way of a control circuit and a servo valve having control parts interconnected by a torsion bar so as to be retained in a predetermined position relative to each other, a hydraulic servo motor is operatively connected to the steered wheels of the motor vehicle and in communication with the servo valve such that hydraulic fluid is supplied to the hydraulic servo motor depending on the relative position of the control parts of the servo valve.

5 Claims, 2 Drawing Sheets

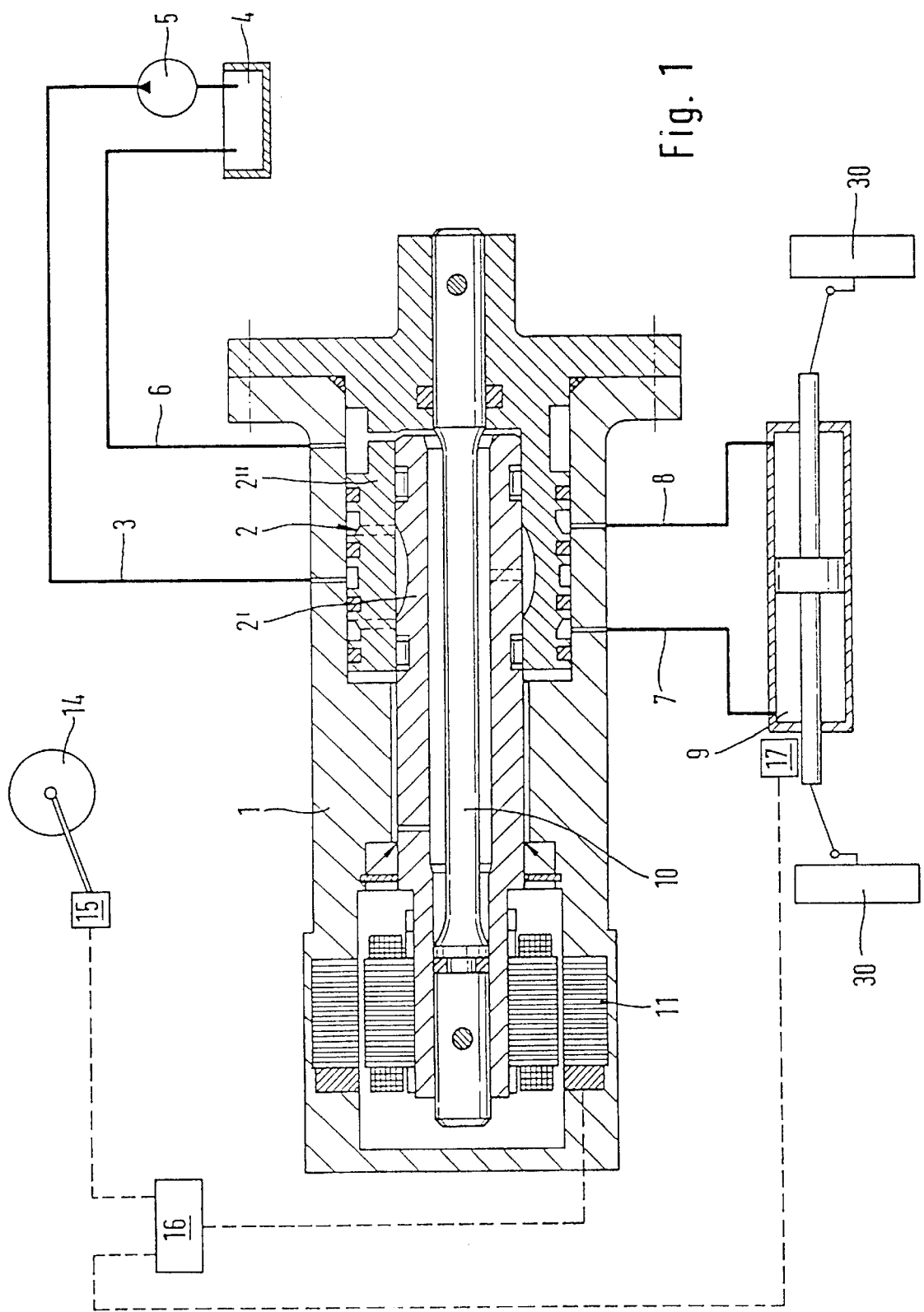

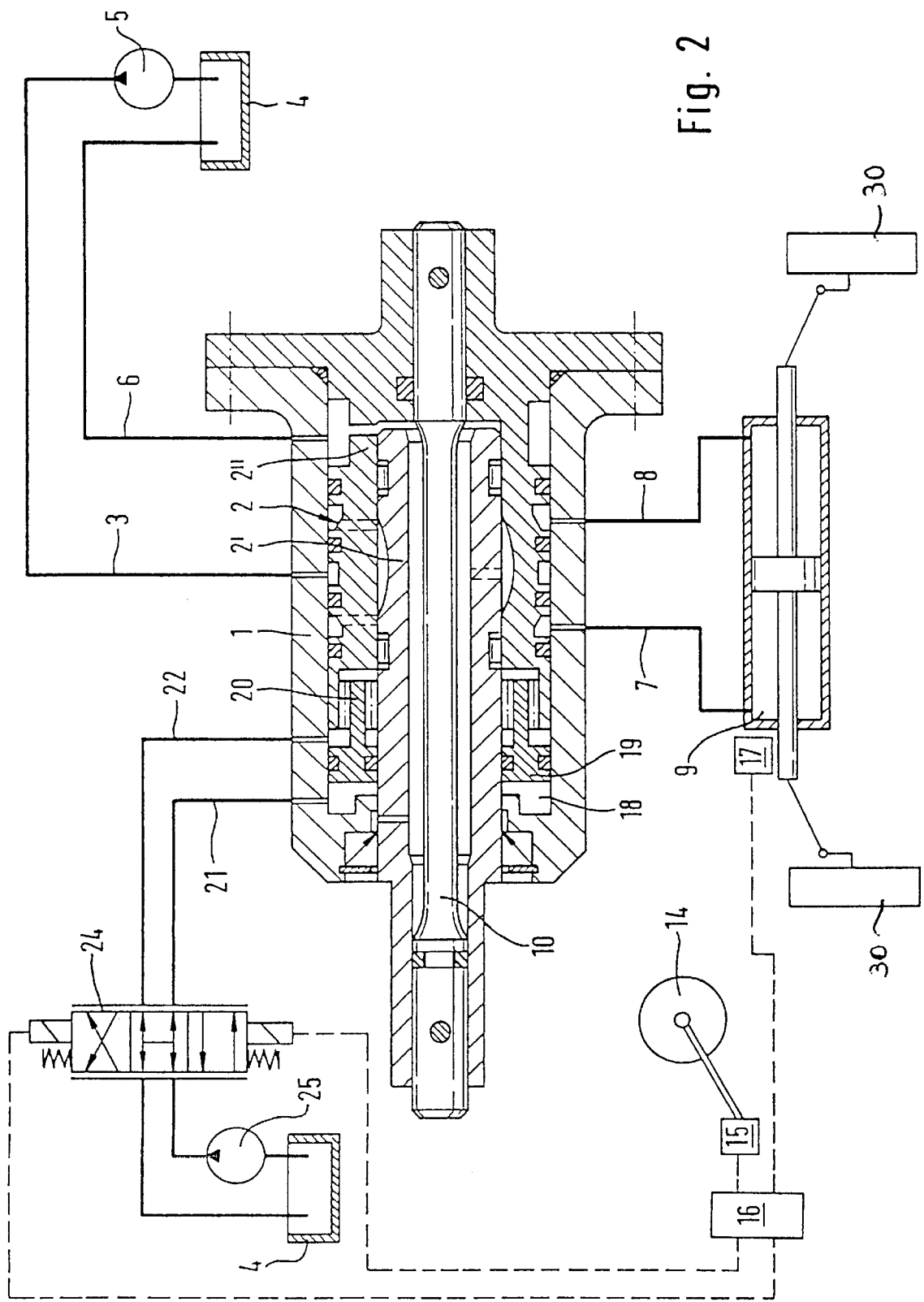

POWER STEERING FOR MOTOR VEHICLES

BACKGROUND OF THE INVENTION

The invention relates to a hydraulic power steering for motor vehicle with a servo valve in the form of a rotary spool valve having control components which are rotatable relative to each other and interconnected by spring means, preferably a torsion rod which retains them in a normal relative position and with a steering gear arrangement which is connected to the steered vehicle wheels and to a hydraulic servo motor controlled by the servo valve.

Power steering systems are generally known and are installed in mass produced vehicles. Usually, a control element, that is, a steering wheel is operatively coupled to the steering gear structure wherein the rotary servo valve is part of the drive connection between the steering wheel and the steering gear structure. Depending on the torque effective between the steering wheel and steering gear structure, the servo valve is displaced in one or the opposite direction whereby the hydraulic servo motor is so controlled that it provides a servo force supporting the steering maneuver so that the manual force needed to operate the steering wheel is reduced.

It is also known basically to operate with the control element only a setting means which then cooperates via a control circuit, with an operating motor, whose control actions are adjusted by a set value—actual position comparison so that the control actions essentially correspond to the movement of the control element. Such control concepts with electronic control circuits are used for example in air planes for the operation of the wing flaps, the elevators and the rudders. These control arrangements, which are also called fly-by-wire controls, have achieved in the meantime such a good safety record that they are used not only in military aircraft but also in commercial passenger air planes.

It is the object of the present invention to utilize such a concept also for motor vehicles and utilize in connection therewith as many proven conventional power steering parts as possible.

SUMMARY OF THE INVENTION

In a hydraulic power steering for a motor vehicle including a steering control element, a position setting means connected to the steering control element so as to be operated thereby, a control motor connected to the position setting means by way of a control circuit and a servo valve having control parts interconnected by a torsion bar so as to be retained in a predetermined position relative to each other, a hydraulic servo motor is operatively connected to the steered wheels of the motor vehicle and in communication with the servo valve such that hydraulic fluid is supplied to the hydraulic servo motor depending on the relative position of the control parts of the servo valve.

With the present invention, the positive mechanical coupling between the control element, that is, the steering wheel and the steered vehicle wheels is eliminated, whereby the control element or steering wheel merely operates a setting means which, via a control circuit, utilizing a comparison between the set value and the actual angular position of the steered vehicle wheels, controls the servo valve and, consequently, the servo motor and the steering mechanism operatively connected thereto. In this arrangement, essential parts of conventional power steering systems can be utilized. However, the steering column of the conventional power steering systems is eliminated so that substantially less installation space is required. At the same time, a multitude of friction generating bearings are eliminated.

In a preferred embodiment of the invention, an electric control motor is provided which is operatively connected to the servo valve by mounting the rotor of the electric motor for rotation with the valve spool part of the servo valve. The other control part of the servo valve may be stationary.

In another embodiment of the invention, a hydraulic control motor is provided which is of such a design that it directly provides for relative motion between the two control components of the servo valve.

Various features of the invention will be described below on the basis of the accompanying drawings which show preferred embodiments of the invention.

BRIEF DESCRIPTION OF THE DRAWINGS

FIG. 1 is a cross-sectional view of a first embodiment of the invention, wherein an electric control motor is provided to operate the servo valve, and FIG. 2 is a cross-sectional view of a modified arrangement wherein the control parts of the servo valve are movable relative to each other by a hydraulic control unit.

DESCRIPTION OF THE PREFERRED EMBODIMENTS

As shown in FIG. 1, a housing 1 includes a servo valve 2 in the form of a rotary spool valve comprising a rotary spool part 2' and a coaxial sleeve part 2" which is firmly mounted in the housing 1. The servo valve 2 includes a pressure connection 3 which is connected to the pressure side of a servo pump 5 that is in communication with the reservoir 4. The servo valve 2 has a low pressure connection 6 which is in communication with the reservoir 4 and two motor connections 7 and 8 which communicate with opposite site sides of a double acting piston cylinder unit forming the servo motor 9.

The servo valve 2 includes a so-called open center whereby all the connections 3 and 6 to 8 are in communication with one another when the rotary spool part 2' and the sleeve part 2" are in a center position relative to each other. If the rotary spool part 2' is rotated relative to the sleeve part 2" in one or the opposite direction out of the center position, a certain controllable pressure differential is generated between the motor connections 6 and 8 when the servo pump 5 is operating whereby the servo motor 9 generates a correspondingly large force action in one or the opposite direction. The rotary spool part 2' and the sleeve part 2" are coupled with each other (by way of the housing 1) by a torsion rod 10 extending through an axial bore in the spool part 2' so that they are held resiliently in the center position relative to each other.

At the left hand end of the rotary spool part 2' as shown in FIG. 1, the electric motor 11 is mounted in the housing 1, the motor having a rotor which is connected to the rotary spool part 2' so that, upon energization of he motor, a torque is applied to the rotary spool part 2' which is rotated thereby in one or the opposite direction relative to the sleeve part 2" against the force of the torsion rod 10.

When the driver of a motor vehicle having the power steering system according to the invention actuates the steering wheel 14 a setting means 15 is operated whose signals provide a desired value for the steering angle of the steered vehicle wheels 30 which are controlled by the servo motor 9, the signals being supplied to the input side of a control circuit 16. The control circuit 16 compares the desired value with the actual position of the steered vehicle wheels 30 which is provided by an actual position sensor 17. The actual position sensor 17 cooperates with a steering gear component operatively connected to the steered vehicle wheels, as shown in FIG. 1, with the piston rod of the servomotor 9. Depending on the result of the desired value—actual position comparison, the control circuit 16 energizes the electric motor 11 such that it rotates in one or the opposite direction and rotates the rotary part 2' of the servo valve 2 more or less in the one or the opposite direction. As a result, a corresponding pressure difference is generated at the motor connections 7 and 8 whereby the servo motor is actuated in one or the opposite direction with a corresponding force so that the steered vehicle wheels 30 are adjusted accordingly.

The embodiment of FIG. 2 is different from that according to FIG. 1 mainly in that, instead of the electric motor, a hydraulic motor is utilized to generate the relative movement between the rotary spool part 2' and sleeve part 2". In this embodiment, the housing 1 includes an annular space 18 whose inner cylindrical wall is formed by a cylindrical axial extension of the rotary spool part 2' and whose outer cylindrical wall is formed by the inside wall of the housing 1. The annular space 18 is divided into two annular chambers by an annular piston 19 which is axially movably disposed in the annular space 18. The annular piston 19 includes a hollow cylindrical extension 20 which has grooves and webs formed at its inner and outer cylindrical surfaces in such a way that those at the inner and outer surfaces extend in an oblique fashion with respect to each other. These grooves and webs are in engagement with corresponding webs and grooves formed on the outer surface of the rotary spool part 2' and on the inner surface of the sleeve part 2" or directly on the inner surface of the housing 1. Since the webs and grooves on the outer surface of the cylindrical extension 20 are oriented in an oblique fashion with respect to the grooves and webs on the inner surface of the inner extension 20 and the annular piston 19 are moved axially when the rotary spool part 2' and the sleeve part 2" are rotated relative to each other. Vice versa, the rotary spool parts 2' and the sleeve part 2" are rotated relative to each other in one or the opposite direction when the annular piston 19 is moved axially in one or the opposite direction.

The annular chambers separated in the annular space 18 by the annular piston 19 are in communication with a pump 25 and the hydraulic fluid reservoir 4 by way of fluid lines 21, 22 which include a control valve 24 which is operated so as to generate a particular pressure difference between the two annular chambers in the annular space 18 in one or the opposite sense. This pressure difference causes corresponding displacement of the annular piston 19 in one or the opposite axial direction whereby the servo valve is controlled so as to generate a pressure difference between the connections 7 and 8 of the servo motor 9. As a result the servo motor is actuated to provide an adjustment movement by which the vehicle's steering mechanism and the vehicle wheel position is changed.

Operation of the arrangement according to FIG. 2:

When the steering wheel 14 is rotated, the setting means changes the set point value for the angle of the steered vehicle wheels 30. The control circuit 16 again compares the set point value with the actual wheel position value provided by the position sensor 17 and operates the valve 24 whenever there is a difference between the setpoint value and the actual wheel position value.

Depending on the direction of the set-point value—actual position deviation, the control valve 24 is operated in one or the opposite site direction such that the annular piston 19 is moved in one or the opposite direction. This movement provides for a corresponding pressure difference at the connection 7 and 8 of the servo motor 9 whereby the servo motor 9 is operated to compensate for the setpoint value—actual position deviation, that is, the steered wheels are position adjusted corresponding to the set point value.

It is also possible and even advantageous if the electric motor 11 and the hydraulic motor 18, 19 are arranged in a combination in order to be able to control the servo valve 2 by two control units which are independent from each other.

In this case, the electric motor can be energized depending on the set point values of the setting means 15 whereas the hydraulic motor 18, 19 can be operated by an independent control arrangement which reacts to other parameters such as cross wind influences which are sensed by separate sensors and which are compensated for by the independent control arrangement.

The electric motor may not be in the form of a motor but may rather be a so-called rotary magnet which generates a torque in one or the opposite direction.

What is claimed is:

1. A hydraulic power steering for a motor vehicle having steered wheels, said power steering comprising: a steering control element, a position setting means connected to said steering control element so as to be operable thereby and providing a steered vehicle wheel setting value, a steered vehicle wheel position sensor sensing the actual steered vehicle wheel positions and providing a steered vehicle wheel position value and a control circuit comparing said steered vehicle wheel setting value with the actual steered vehicle wheel position value, a control motor connected to said control circuit to be operated thereby depending on the difference between said steered vehicle wheel position and setting values, a servo valve including a housing receiving control parts comprising a sleeve part and a rotary spool part rotatably received in said sleeve part and coupled to said control motor, said sleeve part being connected to said housing, a torsion rod interconnecting said rotary spool part and said housing so as to retain said spool part in a central rest position with respect to said sleeve part and a hydraulic servo motor operatively connected to the steered wheels of said motor vehicle and being in communication with said servo valve for supplying hydraulic operating fluid to said hydraulic servomotor depending on the relative position of the control parts of said servo valve.

2. A hydraulic power steering according to claim 1, wherein said control motor is an electric motor.

3. A hydraulic power steering according to claim 2, wherein said electric motor is a rotary electromagnet.

4. A hydraulic power steering according to claim 1, wherein said control motor is arranged so as to control the movement of said rotary spool part relative to said sleeve part.

5. A hydraulic power steering according to claim 1, wherein said control motor is a hydraulic displacement member which is operatively coupled with said servo valve control parts so as to rotate said control parts relative to each other when said hydraulic displacement member is axially displaced.

* * * * *